US 6,337,637 B1

(12) United States Patent
Kubota et al.

(10) Patent No.: US 6,337,637 B1
(45) Date of Patent: Jan. 8, 2002

(54) COLLISION WITH PEDESTRIAN PREVENTION SYSTEM

(75) Inventors: Koji Kubota; Naoya Noguchi; Satoshi Moteki; Harutada Ooya, all of Tokyo; Hideaki Murakami, Kyoto; Masaya Yamada, Osaka; Hiroshi Takahashi, Yokohama; Akihiko Takiguchi, Tokyo; Akira Kuno, Kariya; Hisashi Ezure, Kawasaki; Tetsuaki Kondo; Ryoji Matsubara, both of Tokyo; Yasuyuki Ohira, Kawasaki; Kenichi Ohtani; Hiroshi Mashimo, both of Tokyo; Takao Inobe, Kadoma; Kazumasa Miyamoto; Kazutaka Kawahara, both of Tokyo, all of (JP)

(73) Assignee: Public Works Research Institute, Ministry of Construction (JP)

( * ) Notice: Subject to any disclaimer, the term of this patent is extended or adjusted under 35 U.S.C. 154(b) by 0 days.

(21) Appl. No.: 09/693,221

(22) Filed: Oct. 20, 2000

(30) Foreign Application Priority Data

Oct. 27, 1999 (JP) ............................................. 11-305091

(51) Int. Cl.[7] ................................................. G08G 1/00
(52) U.S. Cl. .................... 340/901; 340/425.5; 340/435; 340/436; 340/917; 340/925; 340/944; 701/301; 701/117; 180/271; 367/909
(58) Field of Search ................................ 340/901, 905, 340/907, 925, 933, 944, 425.5, 436, 435, 917; 701/301, 117; 180/271; 367/909

(56) References Cited

U.S. PATENT DOCUMENTS

| 5,432,509 | A | * | 7/1995 | Kajiwara ..................... 340/903 |
| 5,515,026 | A | * | 5/1996 | Ewert .......................... 340/436 |
| 5,654,705 | A | * | 8/1997 | Houten et al. .............. 340/944 |
| 6,035,053 | A | * | 3/2000 | Yoshioka et al. ........... 382/104 |
| 6,223,125 | B1 | * | 4/2001 | Hall ............................ 701/301 |

* cited by examiner

Primary Examiner—Nina Tong
(74) Attorney, Agent, or Firm—Fulbright & Jaworski L.L.P.

(57) ABSTRACT

The collision with pedestrian prevention system according to the present invention comprises pedestrian detection means, road surface conditions detection means, road information accumulation means, vehicle position detection means, vehicle state detection means, processing means, information output means, and vehicle control means. Because of the configuration, the driver is alerted the presence of any pedestrian on a pedestrian's crossing and can immediately correct operations for handling the vehicle without being perplexed by the information just about to finish crossing the road. This system works only when there is the possibility of collision between a pedestrian on a pedestrian's crossing and a vehicle, and provides automatic controls for decelerating or stopping the vehicle when the driver can stop the vehicle by emergently braking over a distance from the vehicle to the pedestrian's crossing.

2 Claims, 4 Drawing Sheets

COLLISION WITH PEDESTRIAN PREVENTION SYSTEM

FIELD OF THE INVENTION

The present invention relates to a collision with pedestrian prevention system for preventing collision of a running vehicle with a pedestrian walking on a pedestrian's crossing.

BACKGROUND OF THE INVENTION

As the causes for collision of a running vehicle with a pedestrian walking on a pedestrian's crossing, such causes as a driver's delay in discovering a pedestrian, a driver's mistake as to how to respond to an emergent situation, or a driver's error in handling the vehicle can be enumerated.

To eliminate the causes for traffic accidents as described above, it has been tried to make a pedestrian's crossing more visible, to provide illuminating means or display plates so that existence of a pedestrian's crossing can more easily be detected, or to have information concerning pedestrians displayed on a display unit loaded on the vehicle by way of communications from equipment installed on a road.

Each of these devices is effective in alerting existence of a pedestrian on a pedestrian's crossing, but is not useful in preventing driver's incorrect determination as to how to respond to an emergent situation, nor in correcting the driver's mistake in handling the vehicle, and further even information concerning a pedestrian just about to finish crossing a road through a pedestrian's crossing is given to the driver, which disadvantageously perplexes the driver.

OBJECT OF THE INVENTION

It is an object of the present invention to provide a collision with pedestrian prevention system which can solve the problems in the prior art for preventing vehicle's collision with pedestrians and can deliver accurate information on presence of a pedestrian on a pedestrian's crossing to a driver of a vehicle so that the driver will always make a correct decision in responding to an emergent situation, and also which can correct the driver's incorrect operations in manipulation of the vehicle and does not deliver information on a pedestrian just about to finish crossing a road through a pedestrian's crossing so that the driver will not be perplexed.

To achieve the objects as described above, the system for prevention of a running vehicle with a pedestrian walking on a pedestrian's crossing according to the present invention comprises means for detecting a pedestrian, means for detecting road surface conditions, means for accumulating road information, means for detecting a position of a vehicle, means for detecting a state of a vehicle, a processor, means for outputting information, and means for controlling a vehicle. Be cause of the features as described above, this system operates only when there is actual possibility of collision of a running vehicle with a pedestrian walking on a pedestrian's crossing, and gives an alarm to a driver when the driver can stop the vehicle by emergently braking in response to a distance between the running vehicle and the pedestrian's crossing, and provides automatic controls over the vehicle when it is possible to stop the vehicle by way of automatic control.

DETAILED DESCRIPTION OF THE PREFERRED EMBODIMENTS

Figure 1:
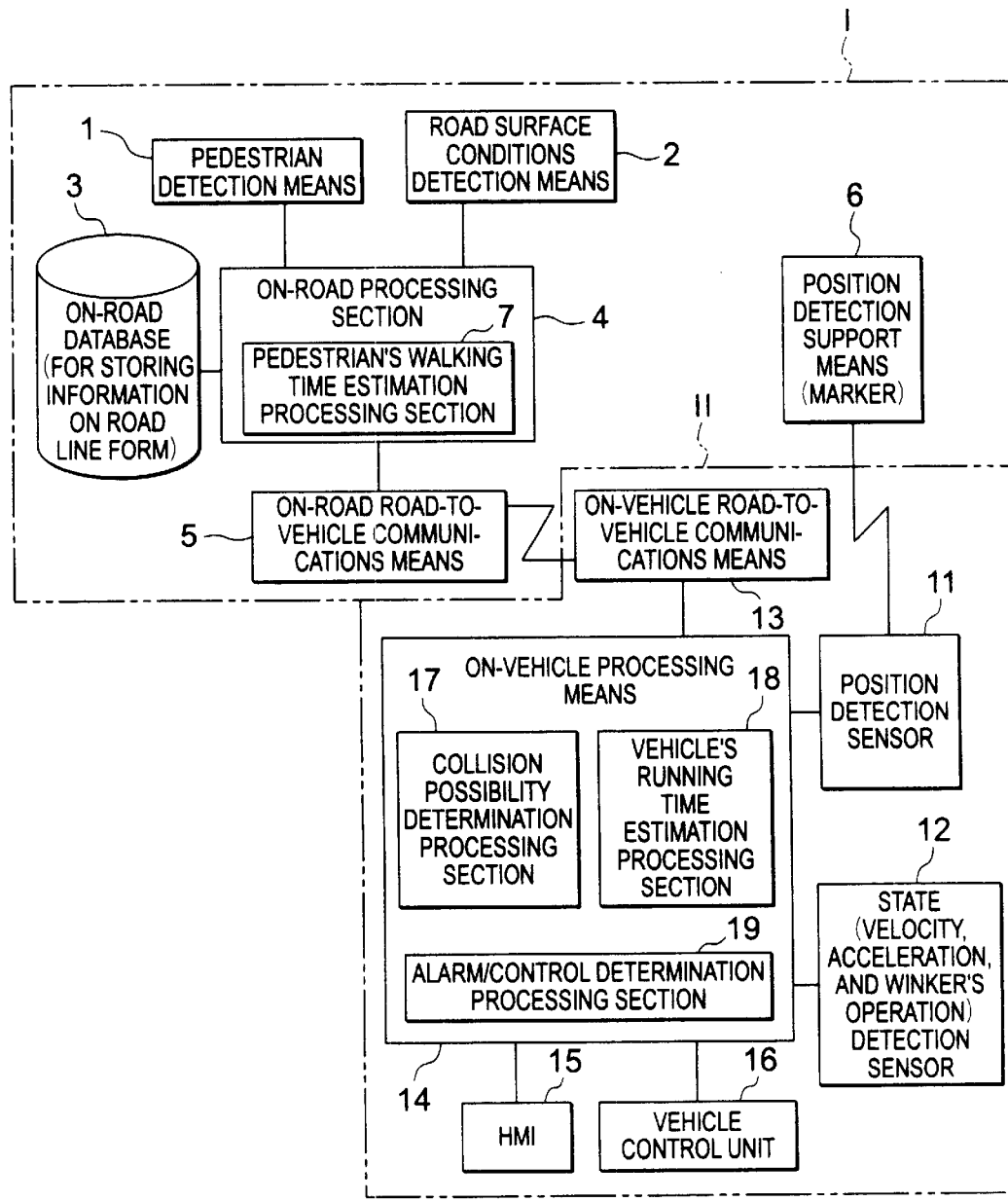
FIG. 1 is a block diagram showing an embodiment of the present invention.

There are a plurality of patterns in arrangement of each means, devices, and equipment provided on a road I and loaded on a vehicle II in embodiments of the present invention, but the facilities provided on the road I in the system shown in FIG. 1 include pedestrian detection means 1 for detecting a pedestrian walking on a pedestrian's crossing; road surface conditions detection means 2 provided near the pedestrian's crossing; an on-road database 3 for storing therein information on road line form; on-road processing means 4 for processing information on pedestrians, road surface conditions, and road line form obtained from the pedestrian detection means 1, road surface conditions detection means 2, and on-road database 3 respectively; on-road road-to-vehicle communications means 5 for transmitting information from the on-road processing means 4; and position detection support means 6, and the on-road processing means 4 has a pedestrian's walking time estimation section 7.

In the system described above, the pedestrian detection means 1 detects a position, a walking speed or other factors relating to a pedestrian including a bicycle driver on a pedestrian's crossing by way of, for instance, the electro-magnetic processing, and provides the information to the on-road processing means 4, and the operation is basically performed by taking pictures of a situation on the pedestrian's crossing with a camera and analyzing the pictures. The road surface conditions detection means 2 detects conditions of a road surface such as freezing or humidity with a laser device or an infrared camera and delivers the data to the on-road processing means 4. The database means 3 stores therein necessary information for the system such as road line information, and provides the information when accessed by the on-road processing means 4. The on-road processing means 4 is the most important means among the various types of means provided on a road in this system, and estimates a pedestrian's behavior from road line form information stored in the database beans as well as from the information concerning the pedestrian's position and walking speed collected by equipment provided on the road. On-road road-to-vehicle communications means 5 is means for communications between the on-road equipment and a vehicle, and in this system, the on-road road-to-vehicle communications means sends information concerning pedestrians, road surface conditions, and road line form, and a base station for mobile telephones and a mobile telephone set, a transceiver for DSRC (dedicated narrow area communications used in the ETC (non-stop automatic fee payment/reception system), a transceiver based on the coaxial leak system may be available for the equipment. The position detection support system 6 is means for providing positional information to support detection of the vehicle's position, and in this system, this means makes it possible for a vehicle's driver to recognize a service-in position, a distance up to a pedestrian's crossing, and a service-out position, and description of this embodiment assumes use of electric waves or a magnetic marker, but also a satellite for the GPS (Global Positioning System) is application for the facility.

The vehicle II has a position detection sensor 11 for detecting a position of the vehicle; a state detection sensor for detecting a running speed, acceleration, and an operating state of a winker of the vehicle; an on-vehicle road-to-vehicle communications device 13 for receiving information concerning pedestrians, road surface conditions, and road line form transmitted from the on-road road-to-vehicle communications means 5; on-vehicle processing means 14 for determining whether an alarm should be given to the driver or automatic controls for the vehicle should be provided based on the information concerning pedestrians, road surface conditions, and road line form obtained from the position detection sensor 11, state position sensor 12, and on-vehicle road-to-vehicle communications device 13 respectively; a HMI (human/machine interface) 15 for alerting the driver based on the information from the on-vehicle processing means 14; and an on-vehicle control unit 16 for controlling the vehicle, and the on-vehicle processing means 14 has a collision possibility determination processing section 17; a vehicle's running time estimation processing section 18; and a determination processing section 19 for deciding whether an alarm should be given to the driver or automatic controls should be provided for the vehicle.

The position detection sensor 11 detects a position of the vehicle based on the information provided from the position detection support means 6, and with this sensor the vehicle's driver can recognize a service-in position, availability of services by the system, a distance up to a pedestrian's crossing, and a service-out position, or the like. The state detection sensor 12 is means for detecting a running speed, acceleration, an operating state of the winker or the like, and a sensor typically used in normal vehicles is available for this sensor. The on-vehicle processing means 14 collects information required for the vehicle and executes computing or determination, and in this system the means 14 has a vehicle's running time estimation processing section for estimating a running time of the vehicle, a collision possibility determination section for estimating the possibility of collision of the vehicle with pedestrians, a determination processing section for deciding whether an alarm should be given to the driver or automatic controls should be provided for the vehicle. The HMI 15 is means for giving an alarm to the driver, and any one typically available for the purpose may be used as the device. The vehicle control unit 16 is a device for controlling a running speed or the like of the vehicle, and any one typically used in ordinary vehicles may be used for this unit.

Figure 2:
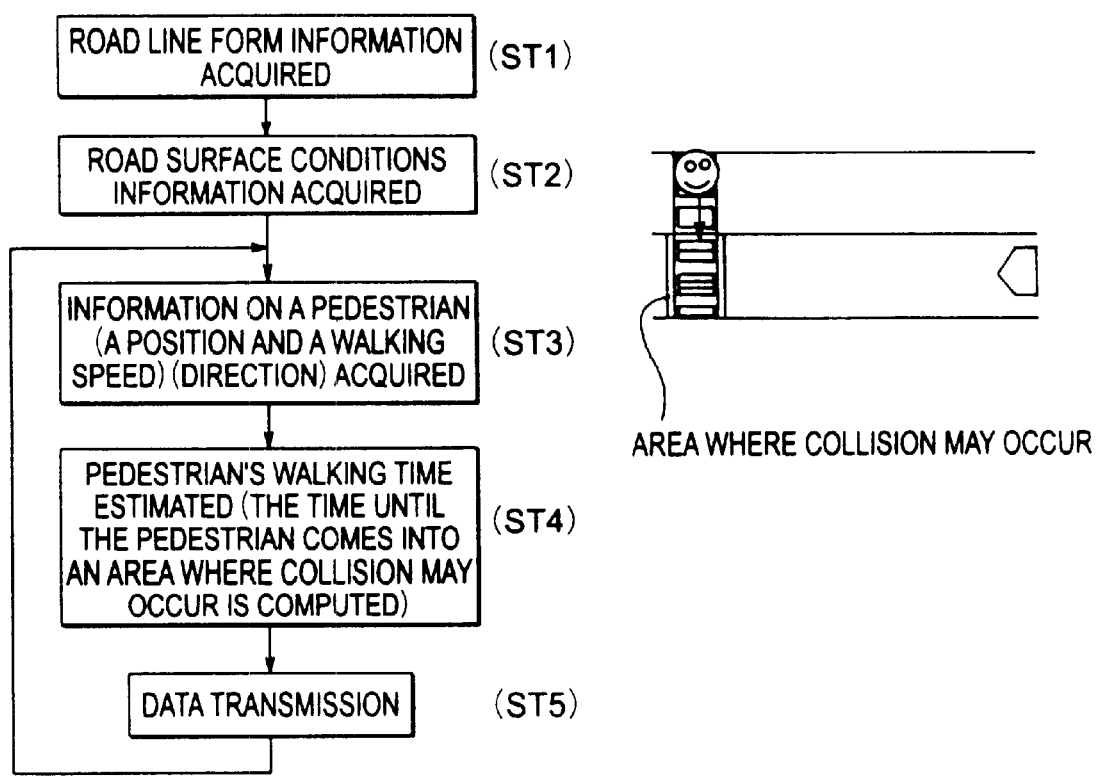
FIG. 2 is a flow chart for processes executed by equipment installed on a road in the system.
Figure 3:
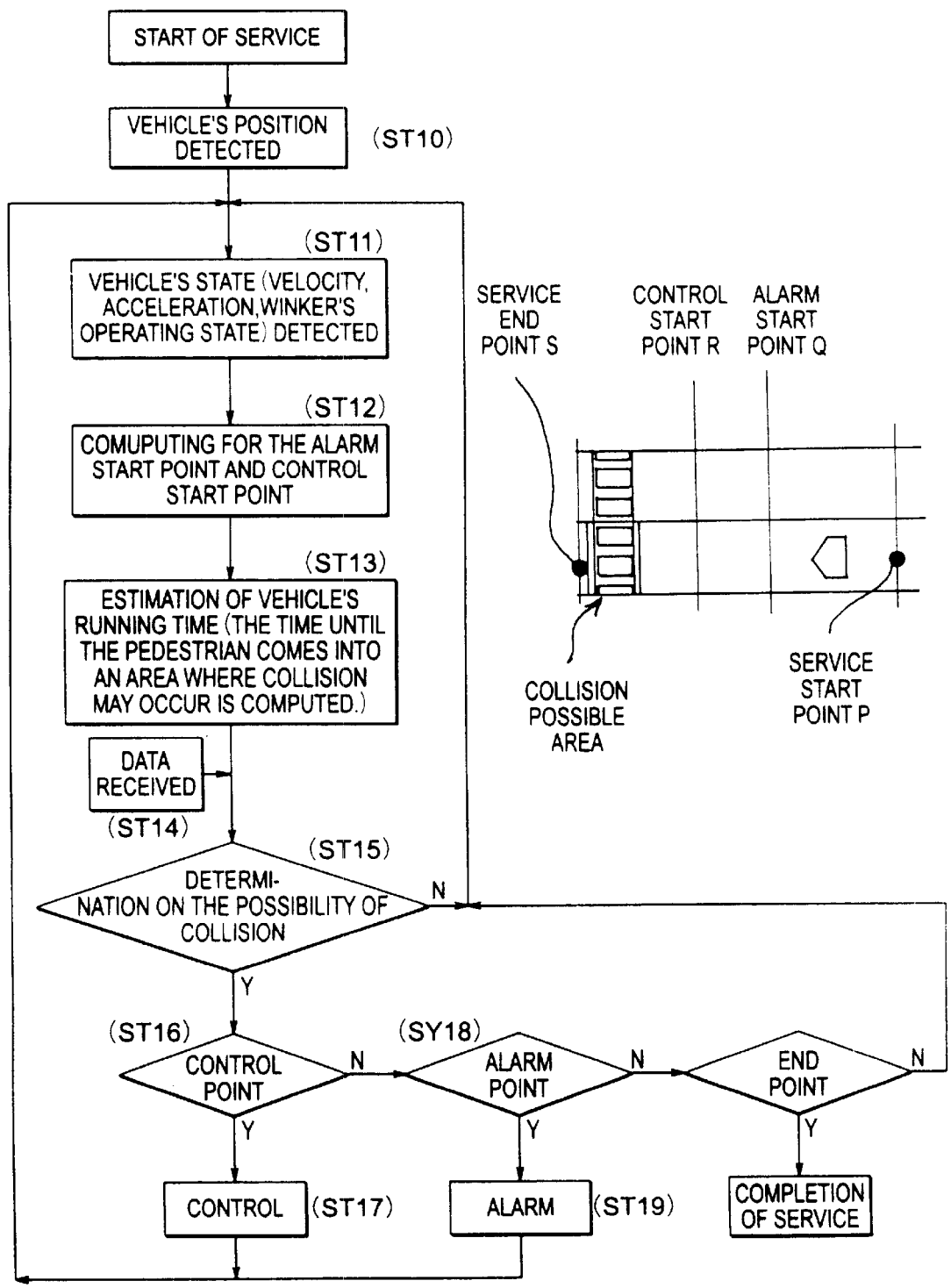
FIG. 3 is a flow chart for processes executed by equipment loaded on the vehicle.

Processing flows in the on-road equipment I and the vehicle II in this system are shown in FIG. 2 and FIG. 3 respectively. As shown in FIG. 2, in the on-road equipment I, acquisition of road line form information (ST1), acquisition of road surface conditions information (ST2), acquisition on pedestrian information (ST3), estimation of pedestrian's walking time (ST4), and data transmission (ST5) are performed.

On the other hand, the vehicle II runs from a service start point P to an alarm start point Q, and then to a control start point R as shown in FIG. 3, and the service according to the present invention is started at the service start point P (ST10) with a running speed, acceleration, and an operating state of the vehicle detected (ST11), computing for the alarm start point and control start point R is executed (ST12), estimation on the vehicle's running time by computing a time required for the vehicle to reach the collision possible area is executed (ST13), the data is received (ST14), determination on the possibility of collision is made (ST15), and when it is determined that there is no possibility of collision, the state when provision of the service is started is restored. On the contrary, if it is determined that there is the possibility of collision (ST15) and also it is determined that the automatic control is stated at the control start position (ST16), the vehicle control unit 16 is activated and automatic controls for the vehicle are provided (ST17). On the contrary, if it is determined that there is no necessity of providing the automatic controls at the control start point (ST16) and also it is determined that an alarm should be given to the driver at the alarm start point (ST16), and alarm is given to the driver, and after the service is completed, the state at the service start position is restored. If it is determined that there is no necessity of giving an alarm to the driver, the vehicle advances to the service end point S, and provision of the service is finished at the point.

Figure 4:
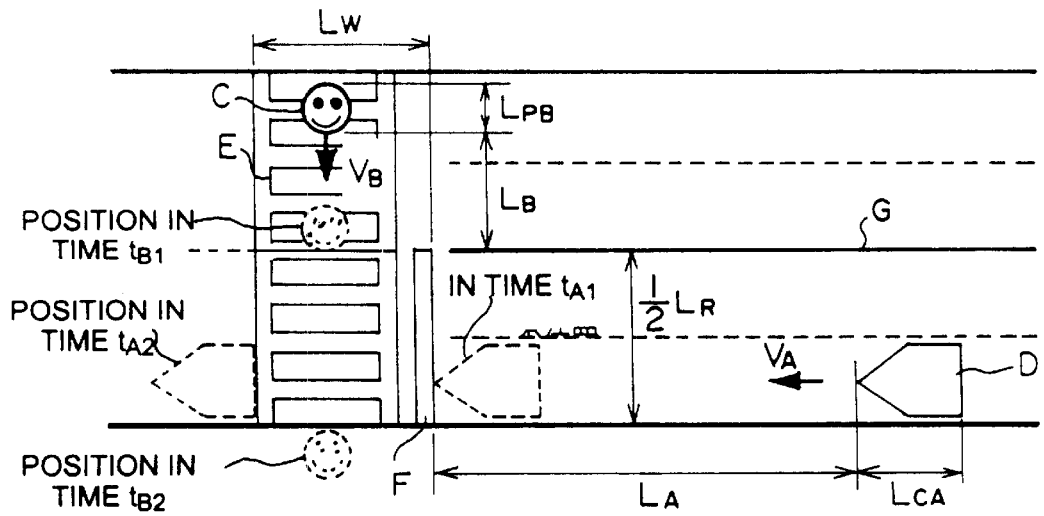
FIG. 4 is an explanatory view illustrating a method of estimating the possibility of collision in the system according to the present invention.

A method of estimating the possibility of collision of a vehicle with a pedestrian in the system is described below with reference to FIG. 4. When it is determined that the pedestrian C and vehicle D are simultaneously present in the left side section of the pedestrian's crossing as shown in the figure, it is determined that there is the possibility of collision. When estimating positions of the pedestrian C and vehicle D, it is assumed that the two moves at the respective constant speed. The direction in the figure is a direction seen from the vehicle D, and a position of the pedestrian C in a rightward section from a center of a pedestrian's crossing E is assumed as positive, and that in a leftward section from a center of the pedestrian's crossing E as negative, while a speed from the left hand side to the right hand side in the figure is assumed as positive and that from the right hand side to the left hand side as negative. Now operations for estimating the possibility of the vehicle D with the pedestrian C moving from right to left is described below.

The time $t_{A1}$ [s] until the vehicle D reaches a stop line F in front of the pedestrian's crossing E, the time $t_{A2}$ [s] until the vehicle D passes through the pedestrian's crossing E, the time $t_{B1}$ [s] until the pedestrian C reaches a center of the pedestrian's crossing E, the time $t_{B2}$ [s] until the pedestrian C reaches a left edge of the pedestrian's crossing E are expressed by the following expression 1, expression 2, expression 3, and expression 4 respectively:

Expression 1

$$t_{A1} = \frac{L_A}{V_A}$$

Expression 2

$$t_{A2} = \frac{L_A + L_{CA} + L_W}{V_A}$$

Expression 3

$$t_{B1} = -\frac{L_B}{V_B}$$

Expression 4

$$t_{B2} = -\frac{L_B + \frac{1}{2}L_R + L_{PB}}{V_B}$$

wherein $L_A$ indicates a distance from a front edge of the vehicle D to a rear edge of the stop line F, $L_B$ indicates a distance from a front side of the pedestrian on the pedestrian's crossing to the central line G, LPB indicates thickness of the pedestrian C, $L_{CA}$ indicates a length of the vehicle D, $L_W$ indicates a distance from a front edge of the pedestrian's crossing E to a rear edge of the stop line F, LR indicates a width of the road, $V_A$ indicates a velocity of the vehicle, and $V_B$ indicates a walking speed of the pedestrian C.

The condition required for evading the collision computed through the expressions is $t_{A1}>t_{B2}$ or $t_{B1}>t_{A2}$.

Figure 5:
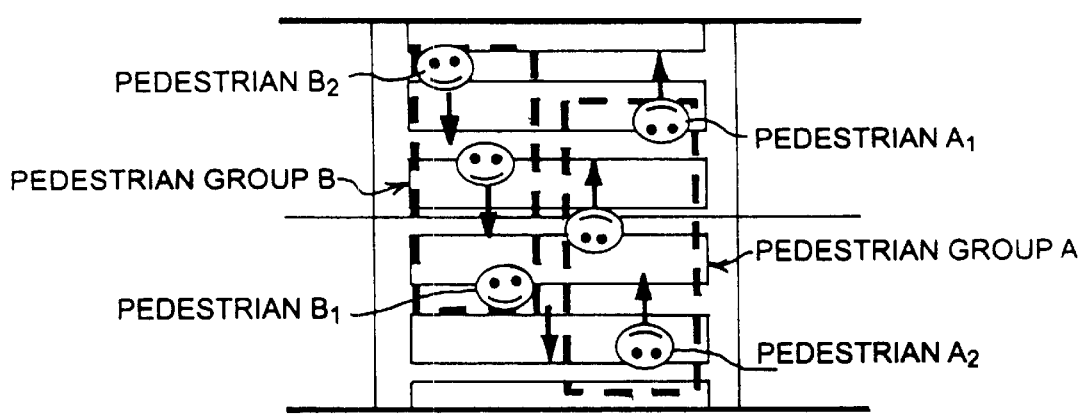
FIG. 5 is a general block diagram illustrating a method of estimating the possibility of collision with a plurality of pedestrians in the system according to the present invention.

Next, a method of extracting necessary data for reducing a quantity of information to be delivered to the vehicle D when there are a plurality of pedestrians on the pedestrian's crossing E is described with reference to FIG. 5. At first the group of pedestrians is divided to a group A of pedestrians walking from left to right when seen from the vehicle D, and a group B of pedestrians walking from right to left. Then pedestrians $A_1$, $B_1$ at the heads of the groups A and B and pedestrians $A_2$, $B_2$ at the ends of the groups A and B are extracted, and information for the pedestrians is provided to the vehicle D. The vehicle D estimates the possibility of collision from the position and velocity thereof assuming that other pedestrians are distributed at an even space between the first pedestrians $A_1$, $B_1$ and the last pedestrians $A_2$, $B_2$. In the processing described above, a number of data concerning pedestrians to be outputted is at maximum 4 per pedestrian's crossing.

As described above, the system for preventing collision of a running vehicle with a pedestrian walking on a pedestrian's crossing according to the present invention comprising the pedestrian detection means, road surface conditions detection means, road information accumulation means, vehicle position detection means, vehicle state detection means, processing means, information output means, and vehicle control means, and this system works only when there is the possibility of collision of the vehicle with a pedestrian walking on the pedestrian's crossing. Further when the driver can stop the vehicle by emergently braking over a distance between the running vehicle and the pedestrian's crossing, the system gives an alarm to the driver, and when the vehicle can be stopped by way of automatic control, the system provides controls for stopping the vehicle. Because of the features as described above, the system can not only alert the driver the presence of a pedestrian on a pedestrian's crossing, but also can give an alarm to the driver or provide automatic controls for stopping the vehicle when there is the possibility of collision of the vehicle with the pedestrian, so that the possibility of occurrence of collision between a pedestrian on a pedestrian's crossing and a vehicle can substantially reduced by generating an alarm at appropriate timing or providing automatic controls for stopping the vehicle.

What is claimed is:

1. A collision with pedestrian prevention system comprising:

on-road facilities including pedestrian detection means for detecting a pedestrian walking on a pedestrian's crossing, road surface conditions detection means for detecting conditions of a road surface, and on-road database means for storing therein road line form information; and a vehicle having vehicle position detection means for detecting a position of the vehicle, vehicle position detecting means for detecting a state of the vehicle, determination processing means for deciding whether necessary information or an alarm should be given to the driver or automatic controls for stopping the vehicle should be provided based on information concerning pedestrians from the pedestrian detection means, information concerning the vehicle from the vehicle state detection means, and information concerning the road line form from the on-road database means, information output means for giving information or generating an alarm to the driver, and control means for providing controls for decelerating or stopping the vehicle, wherein the on-road facilities further include pedestrian's walking time estimation means for making linear estimation of a period of time until a pedestrian on a pedestrian's crossing having the possibility of collision with the vehicle comes into a lane on which the vehicle is currently running based on information concerning a position, a walking time, and a walking speed of the pedestrian, while the vehicle further has vehicle's running time estimating means for estimating a period of time until the vehicle reaches the pedestrian's crossing based on the information concerning a velocity, acceleration, and an operating state of a winker of the vehicle obtained by the vehicle state detection means, and a collision possibility determination means for computing the possibility of collision of the vehicle with the pedestrian based on a result of estimation for the time until the pedestrian comes into the lane on which the vehicle is currently running as well as on a result of estimation for the time until the vehicle reaches the pedestrian's crossing.

2. A collision with pedestrian prevention system comprising: on-road facilities including pedestrian detection means for detecting a pedestrian walking on a pedestrian's crossing, road surface conditions detection means for detecting conditions of a road surface, and on-road database means for storing therein road line form information; and a vehicle having vehicle position detection means for detecting a position of the vehicle, vehicle state detecting means for detecting a state of the vehicle, determination processing means for deciding whether necessary information or an alarm should be given to the driver or automatic controls for stopping the vehicle should be provided based on information concerning pedestrians from the pedestrian detection means, information concerning the vehicle from the vehicle sate detection means, and information concerning the road line form from the on-road database means, information output means for giving information or generating an alarm to the driver, and control means for providing controls for decelerating or stopping the vehicle, wherein a plurality of pedestrians walking on a pedestrian's crossing are divided to two groups according to each pedestrian's walking time, first pedestrians and last pedestrians are extracted from each of the groups, and only a period of time until any of the pedestrians having the possibility of collision with vehicle comes into a lane on which the vehicle is currently running is estimated.

* * * * *